INVENTORS
WILLIAM J. GREENE
NEIL J. NORMANDO
BY
Melford F. Lietze
AGENT

PULSE RATE MULTIPLIER

Filed Oct. 16, 1962 2 Sheets-Sheet 2

INVENTORS
WILLIAM J. GREENE
NEIL J. NORMANDO
BY
Milford F. Lietze
AGENT 3,230,353

PULSE RATE MULTIPLIER

William J. Greene, Bound Brook, and Neil J. Normando, Livingston, N.J., assignors to Air Reduction Company, Incorporated, New York, N.Y., a corporation of New York Filed Oct. 16, 1962, Ser. No. 230,919
5 Claims. (Cl. 235—159)

This invention relates to multipliers, and particularly to pulse rate multipliers, i.e., multipliers in which one of the two input quantities to be multiplied is measured by the number of pulses per unit time in a train of pulses.

The invention is more specifically concerned with a pulse rate multiplier in which the other of the two input quantities is represented by the binary coded decimal system. In that system, each decimal digit is represented by a set of four binary digits, respectively signifying 1, 2, 4 and 8.

A pulse rate multiplier typically expresses its products by means of a train of pulses in which the product is represented by the average number of pulses per unit time. The present invention concerns pulse rate multipliers in which the product is so expressed.

Pulse rate multipliers have been proposed in which an input quantity expressed as the average rate of a pulse train is multiplied by a binary quantity. Such a multiplier typically uses a binary counter for the input pulse train and a plurality of coincidence circuits, each having one input connected to a stage of the binary counter and another input connected to one order of the binary input quantity. The outputs of all the coincidence circuits are connected through a single OR circuit to provide the product output.

A necessary requirement of such a pulse rate multiplier is that no two coincidence circuits may produce outputs concurrently. If that were to happen, output pulses would be lost and accuracy destroyed. The prior art has solved this problem for multipliers wherein the multiplicand is expressed as in pure binary code, but prior to the present invention the problem had not been solved for a multiplicand expressed in the binary coded decimal system.

An object of the invention is to provide a pulse rate multiplier for two quantities, one expressed by a train of pulses whose average rate represents the quantity, and the other expressed by the binary coded decimal system.

Another object of the invention is to provide a pulse rate multiplier of the type described which acts on the two input quantities directly, without converting either quantity into a different system of representation.

A further object of the invention is to provide a multiplier of the type described which is unlimited as to the number of decimal digits in the decimal input quantity.

The foregoing and other objects of the invention are attained in the pulse rate multiplier described herein, in which the multiplicand of the input pulse rate is supplied by a paper tape reader in binary coded decimal form.

Figure 1:
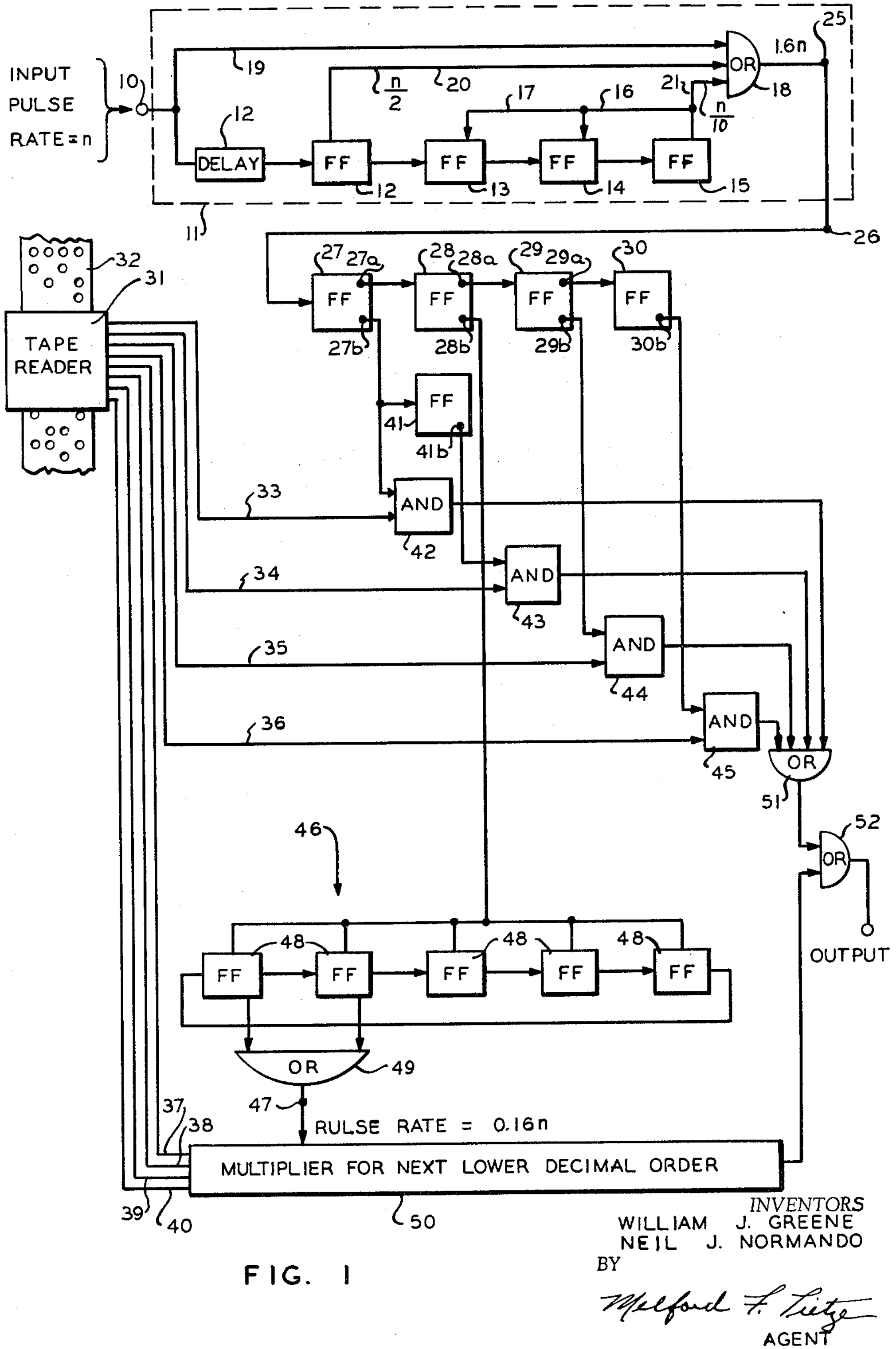
Figure 2:
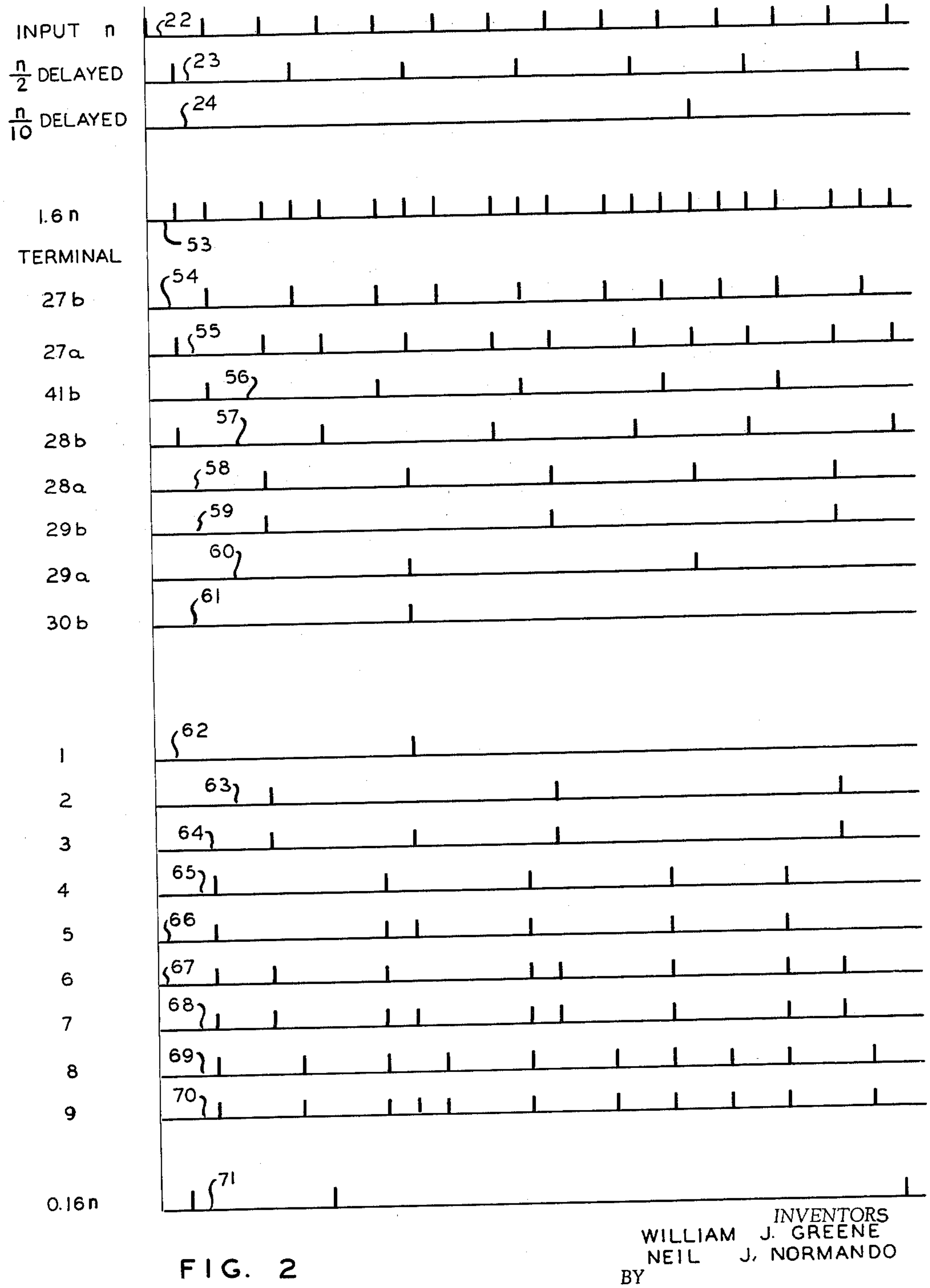

Other objects and advantages of the invention will become apparent from the following specification, taken in connection with the accompanying drawings, in which:

FIG. 1 is a wiring diagram of a pulse rate multiplier circuit embodying the invention; and FIG. 2 is a graphical illustration of the pulses at various points in the circuit of FIG. 1.

Referring to FIG. 1, there is shown a pulse rate multiplier having an input terminal 10.

The multiplier is divided into decimal order sections, and the outputs of all the sections are summed in an OR circuit. The incoming train of pulses at an input rate $n$ is first multiplied by a factor of 1.6. The pulses at the rate of $1.6n$ are then fed to a four-stage binary counter in the first decimal order section. One output of each of the four stages is fed to an input of one of four AND circuits. The other inputs of the four AND circuits are supplied by the tape reader which expresses each decimal digit in a four digit binary code. The outputs of all four of the AND circuits are combined in an OR circuit.

The first stage of the four-stage counterproduces output pulses at a rate of one-half the rate at the input of the counter, i.e., $0.8n$. The second stage of the counter produces output pulses to its associated AND circuit at a rate of $0.4n$. The third stage produces pulses at a rate of $0.2n$ and the fourth stage at a rate of $0.1n$. A tape reader 31 determines the multiplicand by selecting a combination of the four AND circuits to produce the output pulse rate, the combination of the four outputs ($0.8n$, $0.4n$, $0.2n$, and $0.1n$) being selected and added to produced any required output between $0.1n$ and $0.9n$. This output represents the product of the input pulse rate times one decimal order of the multiplicand.

The complementary output from the second stage (at a rate of $0.4n$) may be taken and multiplied by a factor of 0.4 to produce a pulse rate of $0.16n$ to serve as the input of the next lower order in the counter. Similarly, the output of the second stage in each decimal order of the multiplier is utilized to supply input pulses to the succeeding decimal order at times which do not conflict with the output pulses of the preceding orders. The output pules rates of all the orders may then be added in an OR circuit to provide a system output pulse rate defining the whole product. There is thus provided a binary pulse rate multiplier which may be controlled by a binary coded decimal input to determine the multiplicand directly, with no necessity of translating the decimal input into a pure binary figure.

The input pulse rate, which is assumed to be $n$ pulses per second is first multiplied by a factor of 1.6. This preliminary multiplication may be carried out by any suitable conventional multiplying mechanism, a suitable form of which is shown by way of example at 11.

The preliminary multiplier 11 includes a delay line 12, four flip flops 12, 13, 14 and 15 connected as a binary counter, with feedback connections from the output of the final stage through wires 16 and 17 to inputs of the stages 13 and 14, so that it serves as a decimal counter. An OR circuit 18 has three inputs, one from a wire 19 directly from the input terminal 10, supplying pulse at a rate $n$, a second input from the flip flop stage 12, through a wire 20, supplying pulses at a rate $n/2$ and a third input from a wire 21 connected to the output of stage 15 and supplying pulses at a rate $n/10$. In FIG. 2, the line 22 illustrates the pulses at the input terminal 10. The line 23 illustrates the delayed pulses at $n/2$ frequency at the wire 20. The line 24 illustrates pulses at wire 21. The output pulse rate from the OR circuit 18 to the output terminal 25 of the multiplier 11 is the sum of the three separate input pulse rates to the OR circuit 18, or $1.6n$. The pulse rate from output terminal 25 is conveyed directly to input terminal 26 of a pulse rate multiplier including four flip flop stages 27, 28, 29 and 30.

The multiplicand is supplied to the pulse rate multiplier by a tape reader diagrammatically indicated at 31, which is illustrated as reading decimal digits expressed in a binary code from a punched paper tape 32. The binary code includes four binary digits for the expression of each decimal digit. For the highest decimal order, the tape reader is provided with four output lines 33, 34, 35 and 36, representing respectively the highest to the lowest binary orders. For the next lower decimal order, the tape reader 31 has another series of output lines 37, 38, 39 and 40. If the decimal digits appear on the tape in serial order, as is common, then the tape reader includes data storage facilities so that the data appears on the output lines 33–40 in parallel order, i.e., simultaneously for all digits of a given multiplicand.

The flip flops 27, 28, 29 and 30 are coupled to form a binary counter chain.

In the counting chain, the flip flop 27 may be of any suitable conventional construction and has two output terminals 27*a* and 27*b*. As a train of input pulses is supplied to the input of flip flop 27, it produces output pulses alternately at terminals 27*a* and 27*b*. Thus the number of output pulses at each of the output terminals is equal to one-half the number of input pulses. Consequently, the output pulse rate at each of those terminals is equal to one-half the input pulse rate. Since the input pulse rate is 1.6*n*, it may be seen that the output pulse rate at terminal 27*b* is 0.8*n*. The output terminal 27*a* of flip flop 27 is connected to the input of flip flop 28. The other flip flops 28, 29 and 30 function in the same fashion as the flip flop 27. It may therefore be seen that the pulse rate at output terminal 28*b* is 0.4*n*, the output pulse rate at terminal 29*b* is 0.2*n* and the output pulse rate at terminal 30*b* is 0.1*n*. The output pulses from terminal 27*b* are supplied to an auxiliary flip flop 41, having an output terminal 41*b*, where the output pulse rate is the same as at terminal 28*b*. However, since the flip flop 41 is fed from output terminal 27*b* of flip flop 27, whereas flip flop 28 is fed from terminal 27*a*, it should be noted that the output pulses from flip flop 41 are of opposite phase with respect to the output pulses at terminal 28*b*.

The output pulses from terminal 27*b* are supplied to one input of an AND circuit 42. The output pulses from flip flop 41 are similarly supplied to one input of an AND circuit 43. The output pulses from terminals 29*b* and 30*b* are respectively supplied to one input of AND circuits 44 and 45.

Each of the four AND circuits 42, 43, 44 and 45 has a second input. These second inputs are respectively supplied with pulses from the output lines 33, 34, 35 and 36 of the tape reader 31.

A train of input pulses for the next lower order is supplied by taking an output from terminal 28*b*, which has a pulse rate of 0.4*n*, and multiplying it by 0.4 in a multiplier generally indicated at 46, so that the output pulse rate at its output terminal 47 is equal to 0.16*n*, and thus provides a suitable input train of pulses for the next lower decimal order. The multiplier 46 is illustrated as comprising a ring circuit having a chain of five flip flops 48. In such a ring circuit only one flip flop is in the ON condition at any one time. Upon the receipt of an input pulse, which is supplied to all the flip flops of the ring, the one flip flop which was ON is turned OFF and in turning OFF supplies a pulse to the next flip flop for the ring to switch it to its ON condition. Thus by taking outputs from two of the flip flops of the five stage ring and supplying them to an OR circuit 49, the average pulse rate at the output terminal 47 of the OR circuit 49 is equal to 0.4 times the average pulse rate at the input to the multiplier 46, or 0.16*n*.

The train of pulses at the output terminal 47 is supplied to a multiplier 50 for the next lower decimal order. The multiplier 50 may be similar to that shown for the highest order, i.e., it may include a binary counter chain such as the flip flops 27, 28, 29, 30, a set of four AND circuits such as the circuits 42, 43, 44 and 45, an auxiliary flip flop 41, and an OR circuit 51 for adding the outputs of the several AND circuits intto a single pulse train. The multiplier 50 may receive the multiplicand inputs from the lines 37, 38, 39 and 40 of the tape reader 31. The output from the highest order multiplier and the output from the next lower order multiplier 50 are added to form a single pulse train in the OR circuit 52. The OR circuits 51 and 52 may conveniently be combined in a single OR circuit.

Referring now to FIG. 2, the line 53 shows the sum of the pulse trains in the lines 22, 23, and 24, as they are added by the OR circuit 18, so that the line 53 shows the pulse train as it occurs at the output terminal 25 of the 1.6 multiplier or the input terminal 26 of the highest decimal order mutliplier. Line 54 shows the train of pulses appearing at output 27*b* of flip flop 27. Line 55 shows the train of pulses at output 27*a* of flip flop 27. Line 56 shows the train of pulses at output terminal 41*b* of flip flop 41. Line 57 shows the train of pulses at output terminal 28*b* of flip flop 28. Line 58 shows the train of output pulses at terminal 28*a* of flip flop 28. Lines 59, 60 and 61 respectively show the output pulse trains at terminals 29*b*, 29*a* and 30*b*.

Line 62 shows the output pulse train from the OR circuit 51 at a time when the input from the tape reader 31 is a binary coded decimal 1. In other words, at this time a gating current is supplied on only the line 36 of the output lines 33, 34, 35 and 36. Consequently, only the AND gate 45 is open, and only the pulses from output terminal 30*b* of flip flop 30 are passed through the OR circuit 51. Consequently, the pulses appearing in line 62 are the same as those appearing in line 61.

In ilne 63, the pulse rate at the output of OR circuit 51 is shown when the tape reader 31 is reading a binary coded decimal 2. At this time, current is supplied only on the line 35, and there is no current on the lines 33, 34 and 36. Consequently, only the AND gate 44 is open, and only the pulses from terminal 29*b* appear at the output of the OR circuit 51. Consequently, the pulses in line 63 are the same as those in line 59, which represents the pulses at the terminal 29*b*.

Line 64 represents the conditions at the output of OR circuit 51 at a time when the tape reader is reading a binary coded decimal 3. In other words, current appears on the "1" line 36 and on the "2" line 35, so that both gates 44 and 45 are open. The pulses at the output of OR circuit 51 include both the pulses from terminal 29*b* and the pulses from terminal 30*b*.

Line 65 shows the pulse train at the output of OR circuit 51 when the tape reader is reading a binary coded decimal "4." At that time, current appears only on the "4" line 34 and not on the lines 33, 35 and 36. Only gate 43 is open, so that the pulse train in line 65 is the same as that in line 56, representing the pulses at terminal 41*b*.

Line 66 illustrates the pulses at the output of OR circuit 51 when the tape reader is reading a binary coded decimal "5." At this time, current appears on both the "4" line 34 and the "1" line 36, opening both the gates 43 and 45. The pulse train in line 66 includes the pulses in line 65 and 62.

Line 67 shows the pulse train at the output of OR circuit 51 when a binary coded decimal "6" is being read by the tape reader. At that time, current flows in the "4" line 34 and the "2" line 35, so that both gates 43 and 44 are open. The pulses in line 67 represent the sum of the pulses in line 65 plus the pulses in line 63.

Similarly, the pulse rate in line 68 represents a binary "7," being the sum of the current pulse rates in lines 65, 63 and 62.

Line 69 represents the pulse rate when the tape reader 31 is reading a binary coded "8." At this time, there is current only on the "8" line 33 and no current on the lines 34, 35 and 36. Only the AND gate 42 is open, so that the pulses at the output of OR circuit 51 are the same as those at terminal 27*b* (line 54).

Line 70 represents the sum of the pulses in line 69 and line 62, being the pulse rate corresponding to a binary coded decimal "9."

Line 71 shows the pulses supplied to the output terminal 47, which supplies the 0.16*n* pulse rate in the next lower decimal order. It may be observed that the pulses in the line 71 are based on the pulses in line 57, at terminal 28*b*, except that three out of every five of those pulses are omitted in line 71. Observe that the pulses in line 71 are not coincident with any of the pulses in the lines 62 to 70. Consequently, the pulse rates from the multiplier 50 for the next lower order can be added with the pulse rate from the OR circuit 51, that addition being performed by the OR circuit 52, without losing any pulses from the output of the multiplier of either order.

Similarly, the process may be extended for any desired number of decimal orders, without losing any pulses at the final output terminal. In other words, when the input pulses for each order are generated in the manner illustrated, no pulses are lost because of coincidence of pulses from different orders of the multiplier.

While we have described a pulse rate multiplier for use with a binary coded decimal multiplicand, the same principle can be applied to any binary coded multiplicand, whether it is a decimal multiplicand or is based on some other ordinal system. For example, it might be a quinary system instead of a decimal system, in which case the counter chain would only need three flip flops, and only three AND circuits would be required. In that situation, the multiplier 11 would also be a 1.6 multiplier. In any case, the multiplier 11 should multiply the input pulse rate n by a factor equal to $2^x/A^y$, where $x$ and $y$ are any whole numbers or zero. $x$ represents the number of binary stages required to express the largest possible value of any digit in any given order of the multiplicand in a binary code. Where the multiplicand is expressed in a decimal system, as in the above example, four binary stages are required to express each decimal digit in the binary code, so that $x=4$. A is the base of the ordinal system used, and $y$ is the power of the highest order of the base required in the multiplicand input. Typically, $y$ is equal to 1, but might be some other number for special purpose multipliers.

Inasmuch as the multiplicand is to be binary coded, however, it necessarily follows that the ordinal system selected must be non-binary, or have a base, A, of a value other than "2." By definition, the digits of a number, such as any of the multiplicands considered herein, in a non-binary ordinal system likewise will be non-binary. The value of each digit in each order of the number, however, may be represented by a code consisting of a plurality of binary digits, as has been demonstrated hereinbefore by the described embodiment of the invention constituting a binary coded decimal system.

Two novel features cooperate to secure the advantages of this invention. One feature is the use of a multiplier for multiplying the input pulse rate for the highest order by $2^x/A^y$, as described above. The other feature is the derivation of the input pulse rate for each lower order from the out-of-phase output of one stage in the binary chain for the next higher order, combined with an auxiliary counter stage driven from the out-of-phase output of the next preceding counter stage, to control the gate associated with said one stage of the counter. By-out-of-phase output is meant that one of the complementary outputs of the binary stage which is not supplied to the next succeeding counter stage.

In connection with this second feature, the out-of-phase output selected to supply the input pulse train for the next lower order must be multiplied by $2^b/A$, where $b$ is the number of the stage in the chain where the out-of-phase output is taken.

The pulse rate at any output of any counter stage is equal to the input pulse rate of the counter $$\left\{\frac{2^x}{A^y}n\right\} \text{times } \frac{1}{2^b}$$

By multiplying that product by $2^b/A$, we get $$\frac{2^x}{A^{y+1}}n$$

Referring to the specific example illustrated, where A=10, $x=4$, and $y=1$, the input multiplier 11 has a fixed multiplicand of $$\frac{2^x}{A^y}=\frac{2^4}{10^1}=\frac{16}{10}=1.6$$

The output pulse rate of flip flop 28 is $$\left\{\frac{2^x}{A^y}n\right\}\left\{\frac{1}{2^b}\right\}=1.6n\left(\frac{1}{4}\right)=0.4n$$

The multiplier 46 has a fixed multiplicand of $$\frac{2^b}{A}=\frac{4}{10}=0.4$$

so that the pulse rate at terminal 47 is $(0.4n)\ (0.4)=0.16n$.

While we have shown and described a preferred embodiment of our invention, other modifications thereof will readily occur to those skilled in the art, and we therefore intend our invention to be limited only by the appended claims.

What is claim is:

1. Apparatus for multiplying an input pulse rate $n$ by a multiplicand expressed as digits of a non-binary ordinal system, each non-binary digit being represented by a code consisting of a plurality of binary digits, comprising:

(a) preliminary multiplying means having an input and an output and effective to multiply the pulse rate $n$ of a train of input pulses by a fixed multiplicand equal to $2^x/A^y$, where $x$ is the number of binary digits in the code, A is the base of the non-binary digit system, and $y$ is any positive or negative whole number or zero;

(b) a binary counter for each non-binary digit in the multiplicand, each counter including $x$ flip flop stages each having an output terminal, said counter being effective to produce at the respective output terminals trains of pulses at average rates respectively equal to $$\frac{1}{2}, \frac{1}{2^2}, \ldots \frac{1}{2^x}$$

times the pulse rate at the first stage input, (c) means connecting the preliminary output of the multiplying means to the input of the binary counter for the largest non-binary digit;

(d) a set of x AND gates for each non-binary digit;

(e) means responsive to the binary code of each non-binary digit for selectively opening the AND gates;

(f) means connecting the outputs of the flip flop stages of the binary counter to the respective inputs of the AND gates; and (g) OR circuit means having a plurality of inputs connected to the AND gate outputs, and a product pulse rate output terminal.

2. Apparatus as defined in claim 1, including (a) pulse rate supply means for each non-binary digit except the highest order digit, said pulse rate supply means comprising (1) means for taking a train of pulses from one of the binary counter stages of the next higher order having an output pulse rate equal to $$\frac{2^x}{A^y}n\cdot\frac{1}{2^b}$$

where $b$ is any number from 1 to $x$;

(2) means for multiplying said last-mentioned train of pulses by $2^b/A$, thereby producing a pulse train having a rate equal to $$\frac{2^x}{A^{y+1}}n$$

3. A pulse rate multiplier comprising:

(a) preliminary multiplying means having an input and an output and effective to multiply the pulse rate $n$ of a train of input pulses by $16/10^y$, where $y$ is any positive or negative whole number or zero, to produce a train of output pulses having an average pulse rate of $16n/10^y$;

(b) a binary counter including four flip flop stages, each stage having an output terminal, said counter being effective to produce at the respective output terminals trains of pulses at rates respectively equal to ½, ¼, ⅛ and 1/16 of the pulse rate at the input of the first stage;

(c) means connecting the output of the preliminary multiplying means to the input of the first stage of the binary counter;

(d) an output OR stage having four inputs and an output;

(e) four AND gates respectively connecting the four output terminals of the binary counter to the four inputs of the OR stage; and (f) a decimal multiplicand input means selectively operable to any one of ten different conditions, and effective in each of nine of said conditions to open a different combinaion of said AND gates, said combinations being selectable by the input means to produce at the OR stage output a pulse train at a pulse rate equal to the pulse rate at the input to the first stage of the counter times any whole tenth from 0.1 to 0.9, said input means being effective in the tenth of said ten conditions to close all the AND gates associated with said counter.

4. A pulse rate multiplier as defined in claim 3, in which:

(a) each flip flop stage comprises two output terminals and an input terminal, the input terminal of each stage but the first being connected to one of the output terminals of the preceding stage, the respective output terminals of each stage producing output pulse trains of opposite phase;

(b) the counter comprises a fifth flip flop stage having its input terminal connected to that output terminal of the first stage which is not connected to the input terminal of the second stage, so that the fifth stage produces an output pulse train having the same pulse rate as the train from the second stage, but of opposite phase;

(c) and the four counter output terminals which are connected to the four AND gates are output terminals of the first, fifth, third and fourth stages.

5. A plural order pulse rate multiplier comprising:

(a) preliminary multiplying means having an input and an output and effective to multiply the pulse rate $n$ of a train of input pulses by $16/10^y$, where $y$ is any positive or negative whole number or zero, to produce a train of output pulses having an average pulse rate of $16n/10^y$;

(b) a plurality of binary counters, one for each decimal order, each counter including four flip flop stages, each stage having an output terminal, each said counter being effective to produce at its respective output terminals trains of pulses at rates respectively equal to ½, ¼, ⅛ and 1/16 of the pulse rate at the input of the first stage;

(c) means connecting the output of the preliminary multiplying means to the input of the first stage of the highest order binary counter;

(d) an output OR stage having a plurality of inputs and an output;

(e) a plurality of AND gates, four for each binary counter, respectively connecting the four output terminals each thereof to four inputs of the OR stage; and (f) a plurality of decimal multiplicand input means, one for each binary counter, each having input means selectively operable to any one of ten different conditions, and effective in each of nine of said conditions to open a different combination of said AND gates, said combinations being selectable by the input means to produce at the OR stage output a pulse train at a pulse rate equal to the input pulse rate at the first stage of the counter times any whole tenth from 0.1 to 0.9, said input means being effective in the tenth of said ten conditions to close all the AND gates associated with said counter; and (g) means for supplying input trains of pulses to the first stage of the binary counter for each decimal order but the highest, said means comprising, for each order:

(1) means for taking an output train of pulses from the second stage of the next higher order, at a rate equal to 0.25 times the input rate of said next higher order, and (2) means for multiplying the rate of said output train of pulses times 0.4 to produce an input train of pulses at a rate equal to 0.1 times the input rate of said next higher order.

References Cited by the Examiner

UNITED STATES PATENTS

| | | | |
|---|---|---|---|
| 2,910,237 | 10/1959 | Meyer et al. | 235—164 |
| 2,913,179 | 11/1959 | Gordon | 235—164 |

ROBERT C. BAILEY, *Primary Examiner.*

MALCOLM A. MORRISON, *Examiner.*